United States Patent [19]

Sarsten et al.

[11] 4,341,746
[45] Jul. 27, 1982

[54] REMOVAL OF DEGRADATION PRODUCT FROM GAS TREATING SOLUTION

[75] Inventors: Jan A. Sarsten, Millington; Fred J. Heinzelmann, Fanwood; Ferdinand C. Cataneo, Randolph, all of N.J.

[73] Assignee: Exxon Research & Engineering Co., Florham Park, N.J.

[21] Appl. No.: 269,258

[22] Filed: Jun. 1, 1981

[51] Int. Cl.$^3$ .................... B01D 53/34; B01D 9/02
[52] U.S. Cl. ................ 423/228; 260/239.3 R; 260/707; 544/315; 548/317
[58] Field of Search ............... 423/228, 229, 226; 260/239.3 R, 707; 544/315; 548/317

[56] References Cited

U.S. PATENT DOCUMENTS

| 3,102,908 | 9/1963 | Raynes | 260/537 |
|---|---|---|---|
| 3,124,612 | 3/1964 | Cook | 260/707 X |
| 4,112,050 | 9/1978 | Sartori et al. | 423/223 |
| 4,112,051 | 9/1978 | Sartori et al. | 423/223 |
| 4,112,052 | 9/1978 | Sartori et al. | 423/228 |
| 4,180,548 | 12/1979 | Say et al. | 423/223 |
| 4,183,903 | 1/1980 | Melchior et al. | 423/226 |
| 4,282,193 | 8/1981 | Melchior et al. | 423/223 |
| 4,282,194 | 8/1981 | Say et al. | 423/223 |
| 4,292,286 | 9/1981 | Say | 423/223 |

Primary Examiner—Earl C. Thomas
Attorney, Agent, or Firm—Edward H. Mazer

[57] ABSTRACT

A method for separating a cyclic urea degradation product from a solution, such as a scrubbing solution comprising n-cyclohexyl-1,3-propane diamine, an alkali metal carbonate and cyclic urea, is disclosed. The solution is passed to a vacuum crystallization zone wherein at least a portion of the cyclic urea is crystallized after which the solution is passed to a filtration zone for separation of the cyclic urea crystals from the solution.

12 Claims, 1 Drawing Figure

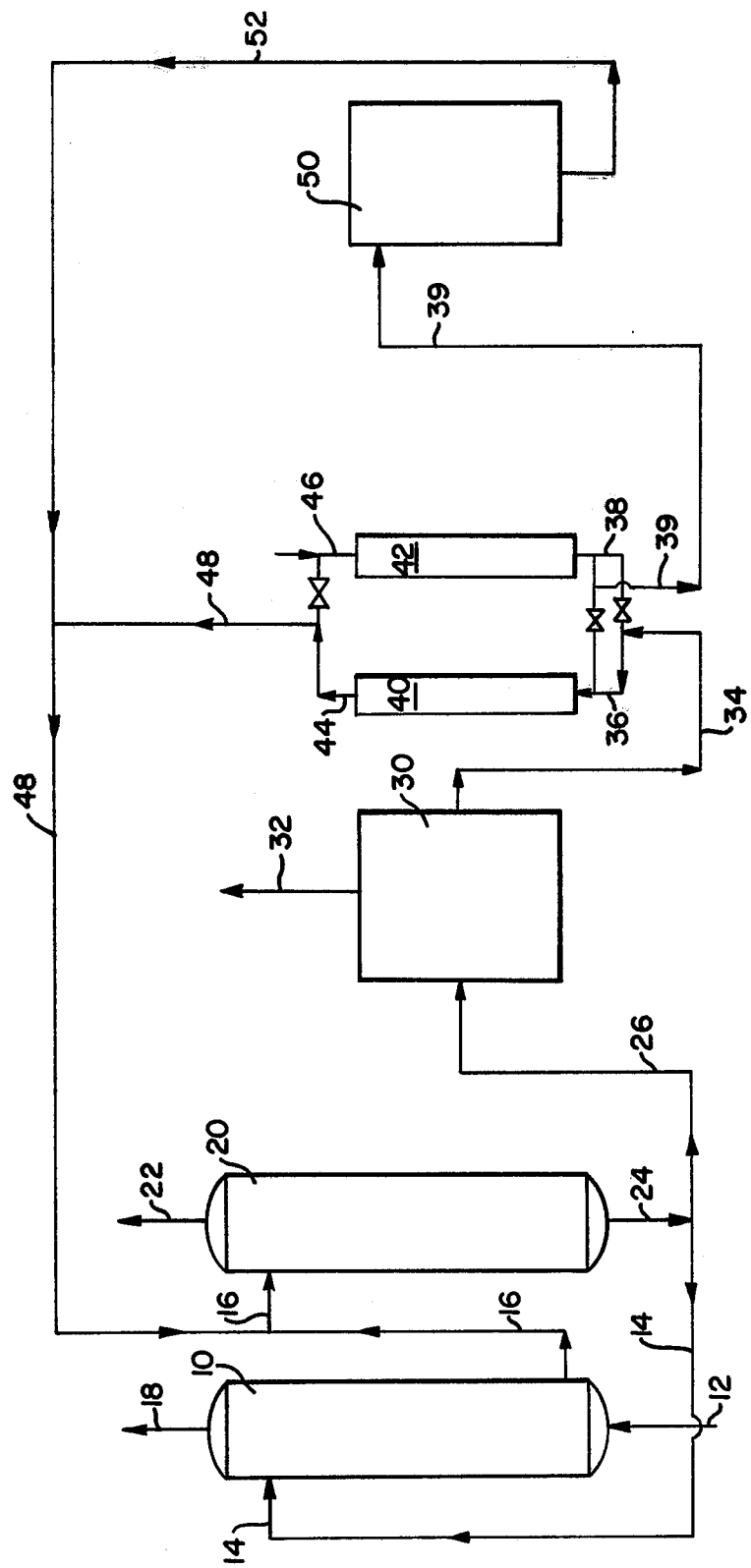

REMOVAL OF DEGRADATION PRODUCT FROM GAS TREATING SOLUTION

BACKGROUND OF THE INVENTION

This invention relates to a process for the removal of a cyclic urea reaction product in an amine gas treating process which involves an absorption and a regeneration system. More particularly, the invention is concerned with the flash crystallization and filtration of a cyclic urea degradation product which forms as a by-product in the gas scrubbing process.

It is well known in the art to treat gases and liquids, such as mixtures containing acidic gases including $CO_2$, $H_2S$, $SO_2$, $SO_3$, $CS_2$, HCN, COS and oxygen and sulfur derivatives of $C_1$-$C_4$ hydrocarbons with amine solutions to remove these acidic gases. The amine usually contacts the acidic gases and liquids as an aqueous solution containing the amine in an absorber tower with the aqueous amine solution contacting the acidic fluid countercurrently.

The acidic scrubbing processes known in the art can be generally classified into three (3) categories.

The first category is generally referred to as the aqueous amine process where relatively large amounts of amine solution are employed during the absorption. This type of process is often utilized in the manufacture of $H_2$ and/or ammonia production where nearly complete removal of the acid gas, such as $CO_2$ is required. It is also used in those instances where an acid gas, such as $CO_2$, occurs with other acid gases or where the partial pressures of the $CO_2$ and other gases are low.

The second category is generally referred to as the aqueous base scrubbing process or "hot potash" process. This type of process is generally used where bulk removal of an acid gas, such as $CO_2$, is desired. This process also applies to situations where the $CO_2$ and feed gas pressures are high. In such processes, useful results are achieved using amine activators in the aqueous potassium carbonate solutions.

A third category is generally referred to as the non-aqueous solvents process. In this process, water is a minor constituent of the scrubbing solution and the amine is dissolved in the liquid phase containing the solvent. In this process up to 50% of amine is dissolved in the liquid phase. This type of process is utilized for specialized applications where the partial pressure of $CO_2$ is extremely high and/or where many acid gases are present, e.g., COS, $CH_3SH$, and $CS_2$.

The present invention relates to a process for the selective separation of a cyclic urea degradation product which may form as a by-product of the practice of the second category of acid scrubbing processes described above. More specifically the invention relates to the aqueous base scrubbing process or "hot potash" process in which a hindered amine is used.

Many industrial processes for removal of acid gases, such as $CO_2$, use regenerable aqueous alkali scrubbing solutions, such as an amine and potassium carbonate which are continuously circulated between an absorption zone where acid gases are absorbed and a regeneration zone where they are desorbed, usually by steam-stripping. The capital cost of these acid scrubbing processes is generally controlled by the size of the absorption and regeneration towers, the size of the reboilers for generating stripping steam, and the size of the condensers, which condense spent stripping steam so that condensate may be returned to the system to maintain proper water balance. The cost of operating such scrubbing plants is generally related to the amount of heat required for the removal of a given amount of acid gas, e.g., thermal efficiency, sometimes expressed as cubic feet of acid gas removed per pound of steam consumed. Means for reducing the costs in operating these industrial processes have focused on the use of absorbing systems or combinations of chemical absorbents which will operate more efficiently and effectively in acid gas scrubbing processes using existing equipment.

It is disclosed in U.S. Pat. Nos. 4,112,050; 4,112,051 and 4,112,052 that sterically hindered amines unexpectedly improve the efficiency, effectiveness and cyclic working capacity of the acid gas scrubbing processes in all three of the above-mentioned process categories. In the case of the sterically hindered amine activated "hot potash" $CO_2$ containing acid gas scrubbing process of the invention described in U.S. Pat. No. 4,112,050, the process can be operated at a cyclic working capacity significantly greater than when diethanolamine or 1,6-hexanediamine is the amine activator used in a similar process. It is believed that the increase in cyclic capacity observed with the sterically hindered amines is due to the instability of their carbamates. In that respect, sterically hindered amines are similar to tertiary amines. However, tertiary amines usually are not used on a commercial scale for carbon dioxide containing acid gas scrubbing due to their low rates of absorption and desorption.

N-alkyl alkylene diamines are advantageously used as sterically hindered amine activators in the "hot pot" process. A preferred sterically hindered amine used as an activator in the "hot pot" process is N-cyclohexyl-1,3-propanediamine (CHPD). This amine in the presence of an amino acid is sufficiently water soluble under absorption and desorption conditions to maintain a single phase and it also has a very high absorption capacity.

Although N-cyclohexyl-1,3-propane diamine has been found to produce excellent results as an activator in the "hot pot" treating process, one drawback in processes where it has been used is that it produces a cyclic urea product when the acid treated gas is rich with $CO_2$. The cyclic urea has a deleterious effect on $CO_2$ removal rates and must be removed and replaced with fresh N-cyclohexyl-1,3-propanediamine. The makeup rate for the hindered amine has a minimal effect on the process economics; however, the cyclic urea that is formed must be selectively removed in order to be able to maintain acid gas removal performance.

Previously, it had been found that cyclic urea may be converted back to the corresponding diamine by maintaining the scrubbing solution at an elevated temperature for an extended time. While this process may be acceptable for scrubbing solutions having $H_2S$ present, the rate of cyclic urea hydrolysis to the corresponding diamine is much lower in the absence of $H_2S$. Further elevating the temperature to increase the hydrolysis rate is not practical in a low $H_2S$ environment, since this may cause decomposition of scrubbing system components. The addition of hydrogen sulfide to the scrubbing solution usually is not advised, since this may act as a poison to catalysts in subsequent processing steps.

U.S. Pat. No. 3,124,612 is directed at a method for crystallizing urea from a concentrated solution to recover fine crystals of urea of improved purity. This patent discloses the use of a scraped surface heat exchanger for deposition of the crystals thereon. This patent does not disclose the use of a vacuum crystallization zone or that the use of a vacuum crystallization zone can improve the filtration properties of the crystallized material over that produced by scraped surface chillers.

U.S. Pat. No. 3,102,908 is directed at the continuous crystallization of adipic acid utilizing a vacuum crystallizer having separate evaporation and crystallization zones. The addition of a liquid polyorgano siloxane is required to reduce the build-up of crystals and to reduce the tendency of the solution to foam.

U.S. Pat. No. 4,183,903 is directed at the discovery that cyclic ureas can be used as anti-foaming agents.

U.S. Pat. No. 4,180,548 and U.S. Pat. No. 4,292,286 are directed at the discovery that cyclic urea can be selectively precipitated from a scrubbing solution by cooling the solution to a temperature range of about 90°–180° F. utilizing a heat exchanger. Since the cyclic urea precipitates on the cold surfaces of the heat exchanger and inhibits further heat transfer for a continuous process, either a scraped surface heat exchanger must be used or a plurality of heat exchangers must be used with alternate service and regeneration cycles. Such a gradual cooling process does not permit accurate control over the crystal size and shape. Generally, the crystals formed from such a process are small and tend to inhibit subsequent filtration. Moreover, scraped surface heat exchangers tend to produce very fine crystals of cyclic urea which are difficult to filter.

Accordingly, it is desirable to provide a process in which the cyclic urea can be separated from the scrubbing solution irrespective of whether hydrogen sulfide is present in the scrubbing solution.

It is also desirable to provide a process in which the crystals of cyclic urea produced are readily separable from the scrubbing solution by filtration.

It is also advantageous to provide a process in which the filter cycles for separating cyclic urea are longer than those currently achievable.

It is also desirable to provide a process in which the cyclic urea separated contains reduced amounts of other scrubbing solution components to permit recovery, sale or disposal of the cyclic urea without the loss of substantial amounts of other scrubbing system components.

SUMMARY OF THE INVENTION

The present invention is directed at a method for at least partially removing a cyclic urea degradation product from a solution containing the cyclic urea comprising the steps of:

A. passing the solution containing the cyclic urea into a vacuum crystallization zone and cooling the entering solution at a rate of at least 4.6° C. per minute to thereby crystallize at least a portion of the cyclic urea in the solution; and B. passing the scrubbing solution containing the crystallized cyclic urea from the crystallization zone to a separation zone wherein at least a portion of the cyclic urea crystals are separated from the scrubbing solution.

In a preferred embodiment the solution is scrubbing solution comprising an aqueous solution of n-cyclohexyl-1,3-propane diamine, pipecolinic acid, an alkali metal carbonate and the cyclic urea. The crystallization zone preferably is a continuous crystallizer wherein cyclic urea continuously is crystallized from a slip steam of scrubbing solution from the scrubbing system. The scrubbing solution containing the crystallized cyclic urea, subsequently is passed through a filtration zone with the filtrate continuously recycled to the scrubbing system.

BRIEF DESCRIPTION OF THE DRAWING

FIG. 1 is a simplified schematic drawing of a commercial installation utilizing the subject invention.

DETAILED DESCRIPTION OF THE INVENTION

Referring to FIG. 1, a simplified schematic flow diagram of a scrubbing system utilizing the subject invention is shown. In this figure pumps, valves, instrumentation and other items not essential to an understanding of this invention have been omitted to simplify the figure.

A conventional scrubbing system is shown comprising a conventional absorption zone 10 and a conventional regeneration zone 20. The design of these units is well known and will not be described further herein. The gas containing the undesired component enters absorption zone 10 through line 12. The scrubbing solution enters near the top of absorption zone 10 through line 14. After removing at least a portion of the undesired component, the scrubbing solution exits absorption zone 10 through line 16 for transfer to regeneration zone 20 while the treated gas stream exits absorption zone 10 through line 18 for further processing. In regeneration zone 20 at least a portion of the undesired component is removed from the scrubbing solution. Typically this is accomplished by operating zone 20 at a substantially lower pressure than zone 10. Substantial quantities of the undesired component are vaporized in zone 20 and exit through line 22 for further treatment or discharge to the atmosphere. The regenerated scrubbing solution exits regeneration zone 20 for return to absorption zone 10 through lines 24 and 14. In a scrubbing solution comprising a cyclic urea degradation product the degradation product will build up and ultimately precipitate from the solution unless it is removed. In the present invention a slip stream of the scrubbing solution, which preferably comprises n-cyclohexyl-1,3-propane diamine, pipecolinic acid (PA), an alkali metal carbonate as well as the cyclic urea, passes through line 26 to a vacuum crystallization zone, such as crystallizer 30. The crystallizer communicates via line 32 with a vacuum source (not shown). The feed, frequently scrubbing solution, is rapidly chilled in crystallizer 30 by flash devolatilization of the more volatile components through line 32. The resulting slurry, containing cyclic urea crystals, passes from crystallizer 30 through line 34 to a filtration zone, such as one of a pair of pressure filters 40,42 arranged in parallel. In this figure filter 40 is in the service cycle while filter 42 is in the backwash cycle. The slurry passes from lines 34 and 36 into filter 40 where at least a portion of the cyclic urea crystals are retained to form a filter cake while the filtrate passes through lines 44 and 48 and 16 for recycle into regeneration zone 20. Filter cake may be removed from pressure filter 42 by conventional means, such as backwashing, through lines 46, 38 and 39 for regeneration in a thermal conversion zone 50 maintained at an elevated temperature, preferably above about 120° C. The cyclic urea which has been re-converted to the corresponding diamine may then be returned to the scrubbing system, as, for example, through lines 52, 48 and 16 into regeneration zone 20.

It has been found that the cooling rate in crystallization zone 30 must be maintained at least about 4.6° C./min. and preferably above about 5.3° C./min. to obtain crystals having the desired shape for rapid, efficient filtration with relatively low rates of filtrate entrapment. Cooling at lower rates results in crystals which tend to pack in the filter means resulting in slower filtration rates, thereby necessitating the use of larger capacity filters, more frequent regeneration cycles and/or more filtrate retention.

The criticality of the filtration rate may be seen from trate to the crystallizer temperature and pouring the filtrate through the fully-formed cake. The filtration and refiltration rates were recorded for each run. The cooling rates and filtration rates for these tests are shown in Table I. From a comparison of run 1 where the cooling rate was 3.4° C./min. and run 3 where half the crystals were formed during batch cooling at a rate of 4.6° C./min. and the other half during semi-continuous flash cooling at a rate too high to be measured, it can be seen that the more rapid cooling resulted in a higher filtration rate, as shown in Table I.

TABLE I

| Run No. | Sol. No. | Mode of Operation | Final Temp., °C. Below Nominal Cloud Point of Crystallizer | Cooling Rate °C./min. | Filtration Rate During Cake Formation GPM/Ft$^2$ Filter | Re-filtration Rate GPM/Ft$^2$ Filter |
|---|---|---|---|---|---|---|
| 1 | 1 | Batch | 11.8° F. | 3.4 | 0.09 | 0.03 |
| 2 | 1 | Batch | 17.4° F. | 0.9 | 0.08 | 0.02 |
| 3 | 1 | Batch and Continuous | 16.8° F. | half batch cooled at 4.6; essentially instantaneously | 0.24 | 0.20 |
| 4 | 2 | Batch | 14.0 | 4.3 | 0.33 | 0.01 |
| 5 | 2 | Batch | 16.8 | 4.6 | 0.38 | 0.18 |
| 6 | 2 | Batch | 25.2 | 5.3 | 0.40 | 0.37 | the following example. In this example feed solutions having the following compositions were used:

| Component | Wt. % Solution No. 1 | Wt. % Solution No. 2 |
|---|---|---|
| potassium carbonate | 20.0 | 20.0 |
| potassium bicarbonate | 7.2 | 7.2 |
| n-cyclohexyl-1,3 propane diamine | 6.3 | 5.4 |
| cyclic urea | 0.8 | 1.6 |
| pipecolinic acid | 3.0 | 3.0 |
| corrosion inhibitor | 0.9 | 0.8 |
| water | Balance | |

In this example the apparatus included a one liter crystallizer vessel with ports for solution addition, product slurry removal, thermometer and vacuum source. Vacuum was provided by a mechanical vacuum pump, while the filtration means comprised a Buchner funnel fitted with #42 Whatman paper. The feed, heated to about 70° C., about 5° C. above its cloud point, was added to the crystallizer vessel through a funnel. Both the crystallizer vessel and funnel had been preheated to preclude premature crystallization, and the vacuum system had been pumped down to the minimum achievable pressure of about 25 mmHg. In the batch mode 500 cc of feed at 70° C. was added to the crystallizer vessel and stirring was commenced. Full vacuum then was applied with the temperature periodically recorded. In the semi-continuous mode, 250 cc of solution at 70° C. was added to the preheated crystallizer and vacuum cooled as in the batch mode. After the indicated final operating temperature was reached, an additional 250 cc of feed solution at 70° C. gradually was added to the crystallizer while crystallization conditions were maintained.

After crystallization was complete, the resulting product slurry was pressured from the crystallizer to the receiving vessel preheated to the slurry temperature. The slurry then was filtered using a similarly preheated Buchner funnel fitted with Whatman No. 42 filter paper. Filtration time for each batch was noted. Filterability also was determined by warming the fil- One method for obtaining the proper crystal shape for desirable filtration rates in a commercial installation may be to continuously flash crystallize the cyclic urea from a solution which is passed to the crystallization zone at a relatively high temperature, such as 125° C., and cooling this to a temperature below the solution saturation temperature, such as to a temperature between about 30° C. and about 50° C.

It may be possible to integrate the cyclic urea separation step into a scrubbing system utilizing CHPD or similar compounds which degrade to cyclic urea by passing scrubbing solution from the absorption zone through the crystallization and filtration zones prior to returning it to the regeneration zone. The size of the crystallization zone and the separation zones will be dependent on the flow rates through these zones and the concentration of cyclic urea in the solution. Typically the feed to crystallization zone 30 will comprise a small slip stream of the scrubbing solution, with the feed rate of the slip stream being adjusted such that the cyclic urea concentration in the scrubbing solution is maintained below the point at which cyclic urea will precipitate from the scrubbing solution. The rate at which cyclic urea forms is a function of many variables including the concentration of absorbed $CO_2$ in the scrubbing solution, the scrubbing solution composition and the scrubbing solution temperature. Typically, the rate of cyclic urea formation will be greater than about 0.1 wt. %/day of the total CHPD present.

The type of vacuum crystallizer utilized is not believed critical, provided that the cooling rate is maintained above 4.6° C./min. Preferred vacuum crystallizers are the continuous crystallizers with the more preferred crystallizers using magma agitation accomplished by continuously pumping a portion of the magma product back to the crystallizer.

The design of the separation or filtration zone also is not critical. The filters should be selected to provide adequate filter cake capacity and filter cake dewatering characteristics at acceptable pressure drops and service intervals. If a continuous flash crystallization system is utilized, it may be necessary to utilize a plurality of filters arranged in parallel, such that one or more filters is in service, while at least one of the filters is undergoing regeneration. Among the types of filters which may be acceptable are pressure filters with the most preferred being in-line cartridge filters.

The method by which the filter cake is removed from the filter will be dependent upon the type of filter used. Where a pressure type filter is used the filter cake usually will be removed by back-flushing with water or steam.

The filter cake, typically consisting essentially of cyclic urea, may be re-converted to the corresponding diamine by heating at an elevated temperature for an extended period of time. Substantially all of the cyclic urea will be reconverted to the corresponding diamine when it is heated at 200° C. for 3 hours. Since the cyclic urea has been concentrated by use of the centrifugation and filtration zones, the size of the vessel utilized to heat the cyclic urea to convert the cyclic urea back to the corresponding diamine will be only a fraction of that required if the cyclic urea had not been concentrated. Moreover, maximum allowable temperature in the reclamation vessel may be higher than that utilized if the cyclic urea were not concentrated, since only small amounts of the other scrubbing system components which may degrade are present. In a system where $H_2S$ is not present and hence the rate of cyclic urea conversion to the corresponding diamine is relatively low, it is expected that the subject invention will result in a many fold decrease in the size of the thermal conversion vessel over that required if centrifugation and filtration zones were not utilized.

While the invention has been described in connection with specific embodiments, it will be understood that this invention is capable of further modification, and that this application is intended to cover any variations, uses or adaptations of the invention and including such departures from the present disclosure as come within known or customary practice in the art to which the invention pertains and as may be applied to the essential features hereinbefore set forth, and as fall within the scope of the invention.

What is claimed is:

1. A method for at least partially removing cyclic urea from a solution containing the cyclic urea comprising the steps of:
   a. passing the solution containing the cyclic urea into a vacuum crystallization zone and cooling the entering solution at a rate of at least 4.6° C. per minute to thereby crystallize at least a portion of the cyclic urea in the solution; and
   b. passing the solution containing the crystallized cyclic urea from the crystallization zone to a separation zone wherein at least a portion of the cyclic urea crystals are separated from the solution.

2. The method of claim 1 wherein the vacuum crystallization zone comprises a continuous vacuum crystallization zone operated at a temperature below the solution saturation temperature to continuously crystallize at least a portion of the cyclic urea in the solution.

3. The method of claim 2 wherein the continuous crystallization zone is operated at a temperature ranging between about 30° C. and about 50° C. to continuously crystallize at least a portion of the cyclic urea in the solution.

4. The method of claim 1 wherein the solution containing cyclic urea is scrubbing solution and wherein the scrubbing solution further comprises n-cyclohexyl-1,3-propane diamine and an alkali metal carbonate.

5. The method of claim 4 wherein the solution containing the cyclic urea further comprises pipecolinic acid.

6. The process of claim 4 wherein the solution containing the cyclic urea is passed into a vacuum crystallization zone and cooled at a rate of at least 5.3° C./minute to thereby crystallize at least a portion of the cyclic urea in the solution.

7. The process of claim 6 wherein the separation zone comprises a plurality of filters disposed in parallel to permit the continuous removal of cyclic urea crystals from the scrubbing solution.

8. The process of claim 7 further comprising an absorption zone and a regeneration zone, the scrubbing solution absorbing acidic compounds in the absorption zone from gas containing the acidic compounds, the scrubbing solution thereafter passing to the regeneration zone wherein at least a portion of the acidic compounds are removed from the scrubbing solution, and wherein the scrubbing solution passed to the crystallization zone is scrubbing solution from the absorption zone.

9. The process of claim 8 wherein the cyclic urea from the filters is passed to a thermal conversion zone where at least a portion of the cyclic urea is reconverted to the n-cyclohexyl-1,3-propane diamine.

10. The process of claim 9 wherein the filtrate from the filtration zone is returned to the regeneration zone.

11. The process of claim 10 wherein the thermal conversion zone is maintained at a temperature of at least 120° C. to convert at least a portion of the cyclic urea to n-cyclohexyl-1,3-propane diamine.

12. The process of claim 11 wherein the n-cyclohexyl-1,3-propane diamine from the thermal conversion zone is returned to the regeneration zone.

* * * * *

UNITED STATES PATENT AND TRADEMARK OFFICE
CERTIFICATE OF CORRECTION

PATENT NO. : 4,341,746

DATED : July 27, 1982

INVENTOR(S) : Jan A. Sarsten; Fred J. Heinzelmann; Ferdinand C. Cataneo

It is certified that error appears in the above—identified patent and that said Letters Patent is hereby corrected as shown below:

Column 5, lines 17, 18 and 19, cancel "°F.".

Column 5, line 21, before "essentially instantaneously" insert --half cooled--.

Column 7, lines 17 and 31, "centrifugation" should read --crystallization--.

Signed and Sealed this

Fourteenth Day of February 1984

[SEAL]

Attest:

GERALD J. MOSSINGHOFF

Attesting Officer

Commissioner of Patents and Trademarks